(12) United States Patent
Suzuki et al.

(10) Patent No.: US 7,253,590 B2
(45) Date of Patent: Aug. 7, 2007

(54) OUTPUT CONTROL DEVICE OF GENERATION DEVICE

(75) Inventors: Hideaki Suzuki, Numazu (JP);
Masakatsu Takahashi, Numazu (JP);
Shuichi Muramatsu, Numazu (JP);
Tomohiro Nakagawa, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 72 days.

(21) Appl. No.: 11/263,809

(22) Filed: Nov. 1, 2005

(65) Prior Publication Data

US 2006/0097703 A1      May 11, 2006

(30) Foreign Application Priority Data

Nov. 5, 2004  (JP) ............................. 2004-322197

(51) Int. Cl.
*H02P 9/44* (2006.01)
(52) U.S. Cl. ............................. 322/20; 322/28; 363/40
(58) Field of Classification Search ............... 322/20, 322/24, 27, 28, 37; 363/40, 98
See application file for complete search history.

(56) References Cited

U.S. PATENT DOCUMENTS

| | | | | |
|---|---|---|---|---|
| 5,550,457 A | * | 8/1996 | Kusase et al. ............. | 322/29 |
| 5,719,484 A | * | 2/1998 | Taniguchi et al. ......... | 322/20 |
| 5,726,558 A | * | 3/1998 | Umeda et al. ............. | 322/27 |
| 5,726,559 A | * | 3/1998 | Taniguchi et al. ......... | 322/34 |
| 5,739,677 A | * | 4/1998 | Tsutsui et al. ............. | 322/25 |
| 6,940,259 B2 | * | 9/2005 | Suzuki et al. ............. | 322/20 |
| 7,157,885 B2 | * | 1/2007 | Nakagawa et al. ........ | 322/28 |

FOREIGN PATENT DOCUMENTS

JP        11-046456        2/1999

* cited by examiner

*Primary Examiner*—Nicholas Ponomarenko
(74) *Attorney, Agent, or Firm*—Pearne & Gordon LLP

(57) ABSTRACT

An output control device of a generation device including: a rectifier circuit that rectifies an output of an AC generator and applies the output across a battery; an inverter circuit provided between the battery and the generator; inverter control means for controlling the inverter circuit to convert a voltage across the battery into an AC control voltage and apply the voltage to an armature winding of the generator; and phase detection means for detecting a phase of a phase current flowing through the armature winding of the generator as a maximum output current phase, wherein the inverter control means is comprised to control a phase of the AC control voltage so as not to be delayed with respect to the maximum output current phase, and thus prevent a reduction in the output of the generator caused by an excessive delay of the phase of the AC control voltage.

6 Claims, 10 Drawing Sheets

Fig. 4
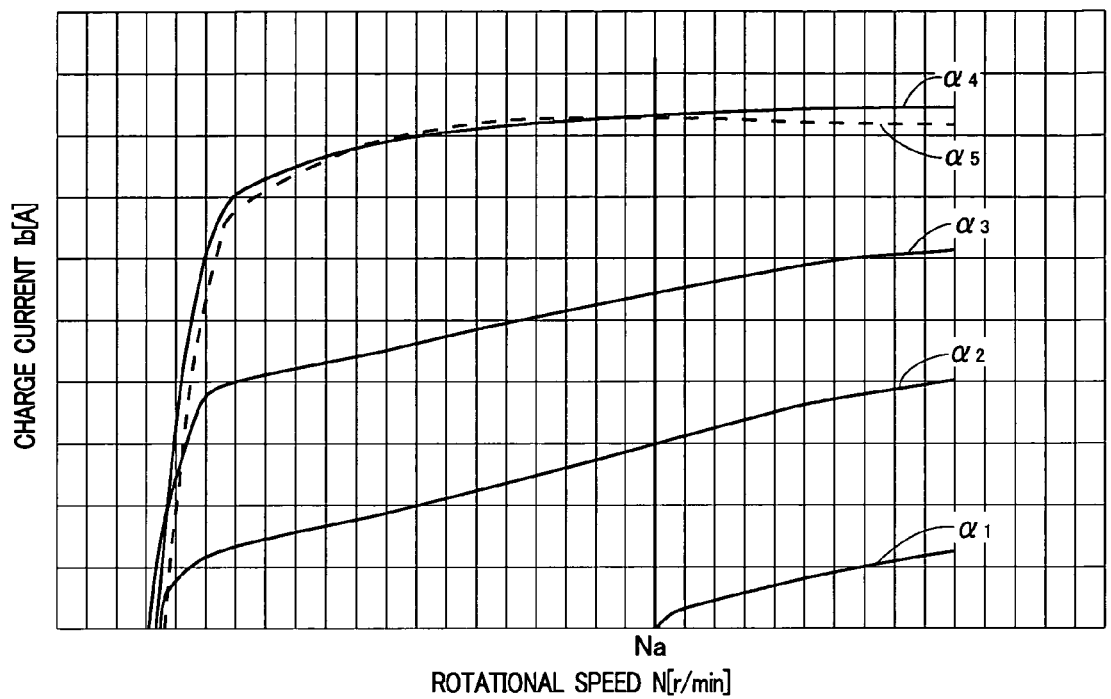
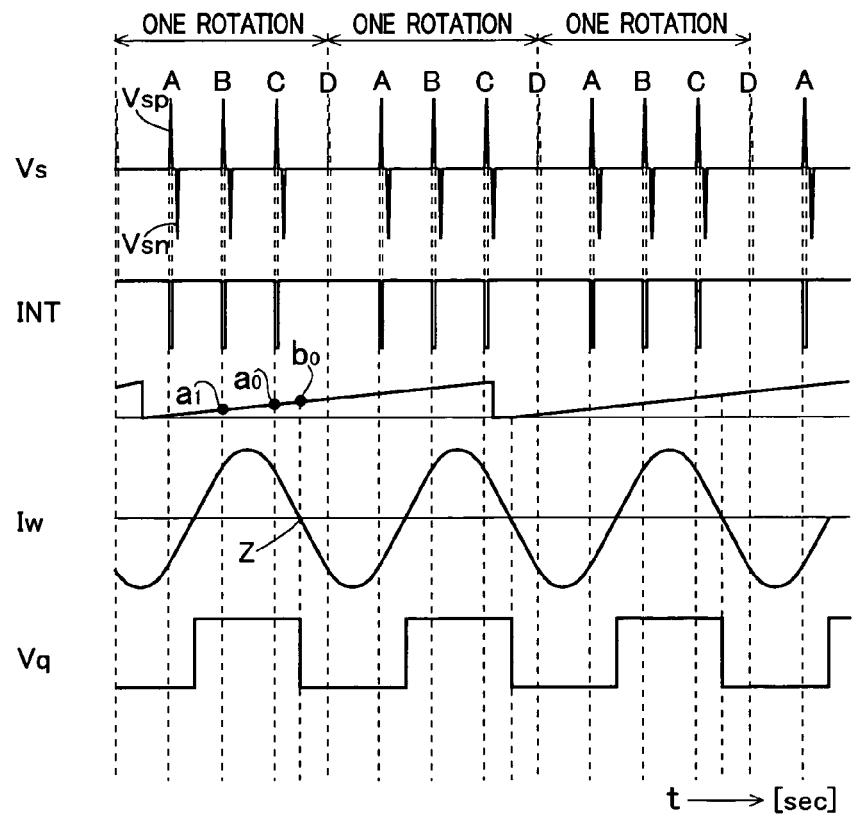
Fig. 5A  Vs
Fig. 5B  INT
Fig. 5C
Fig. 5D  Iw
Fig. 5E  Vq

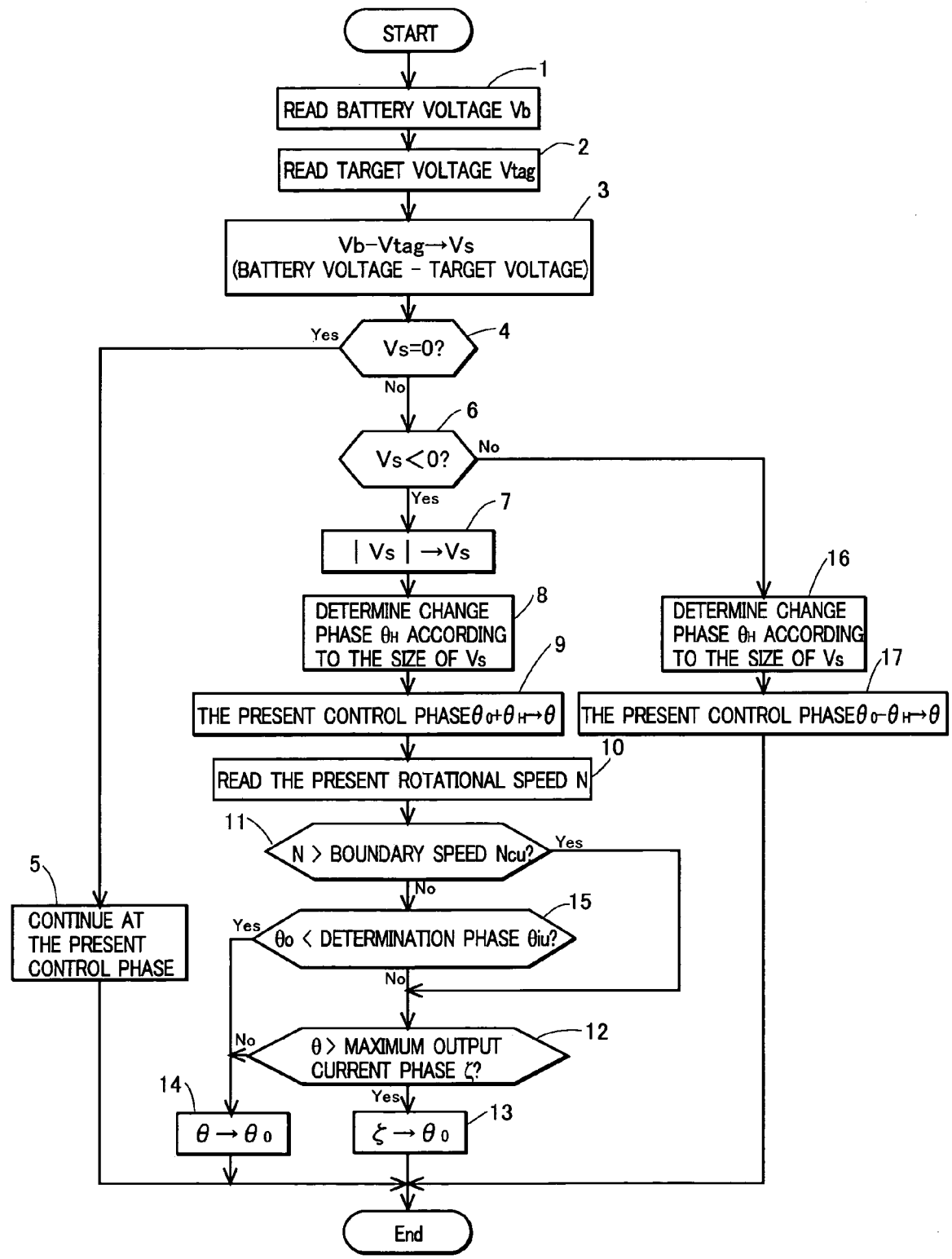

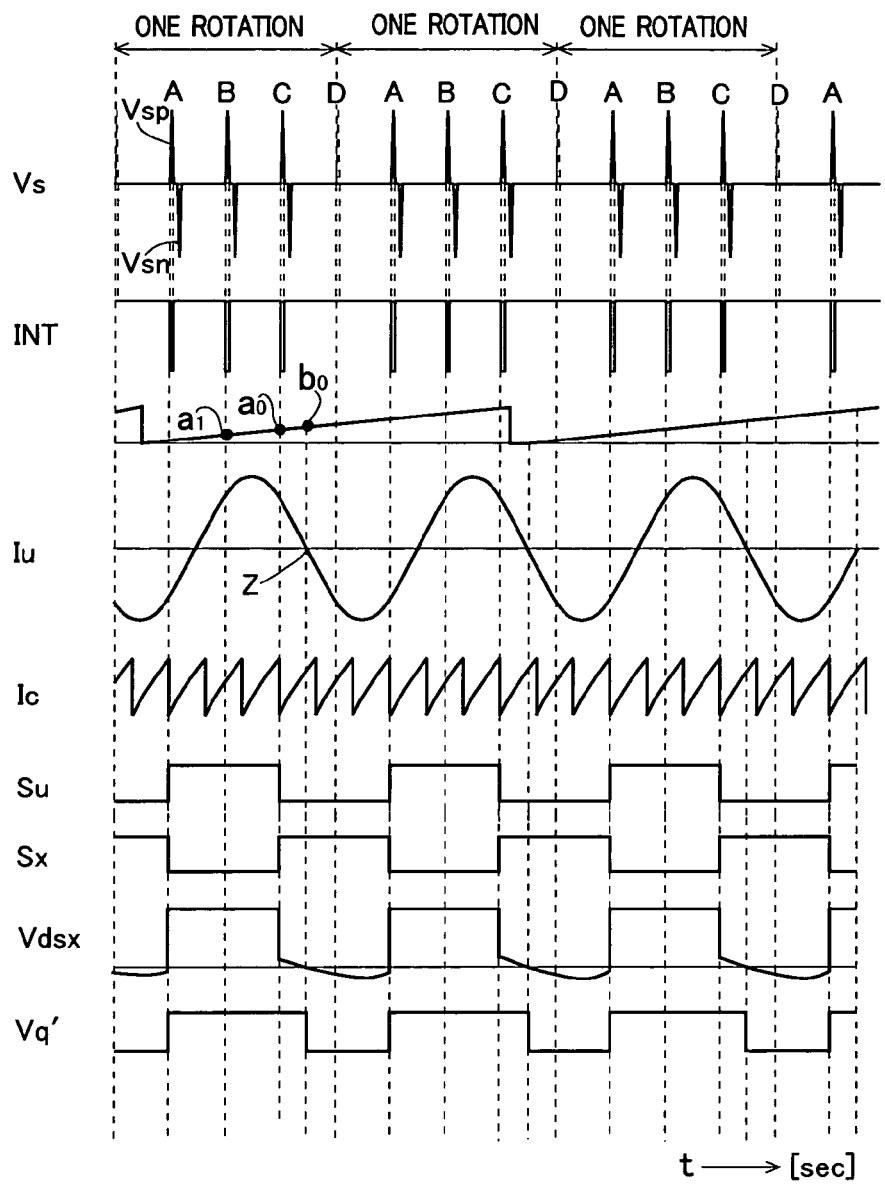

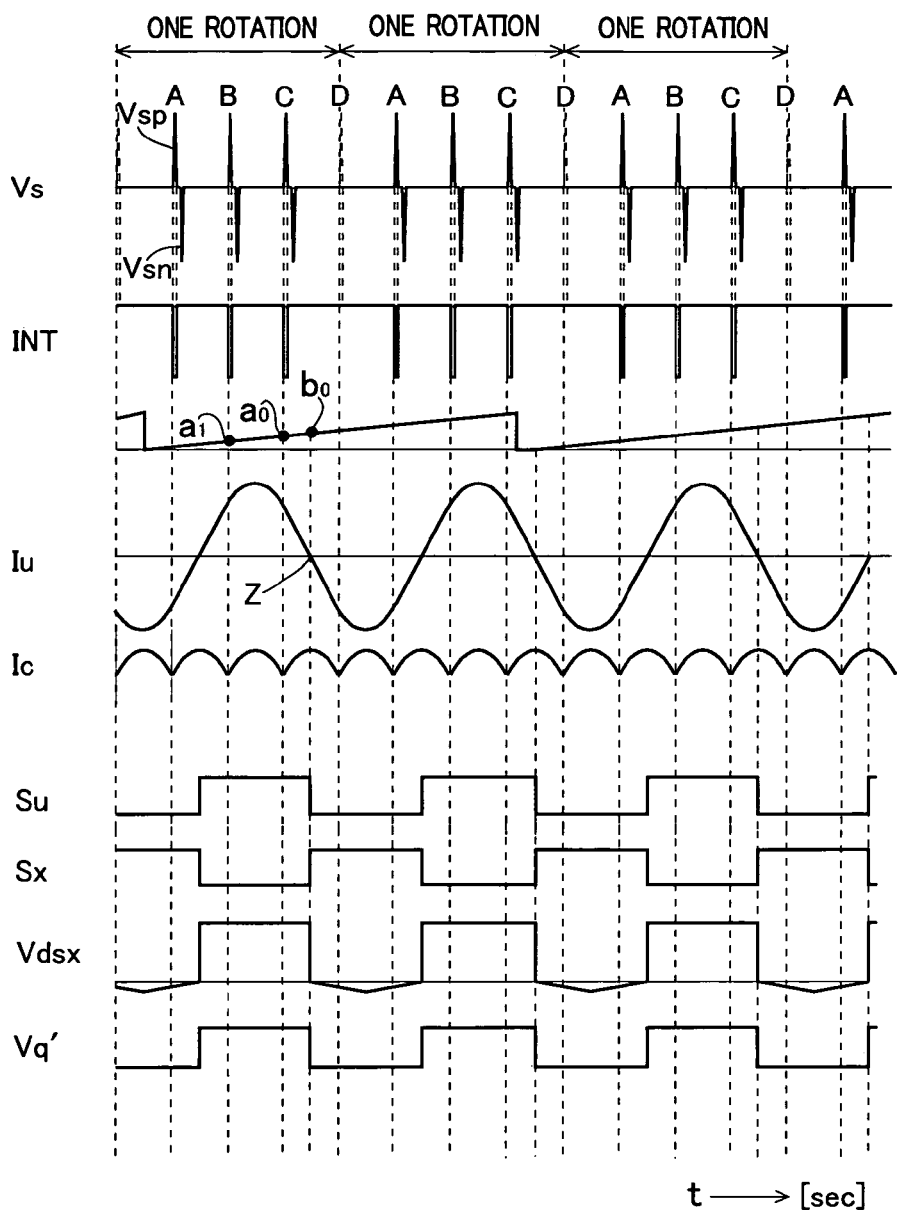

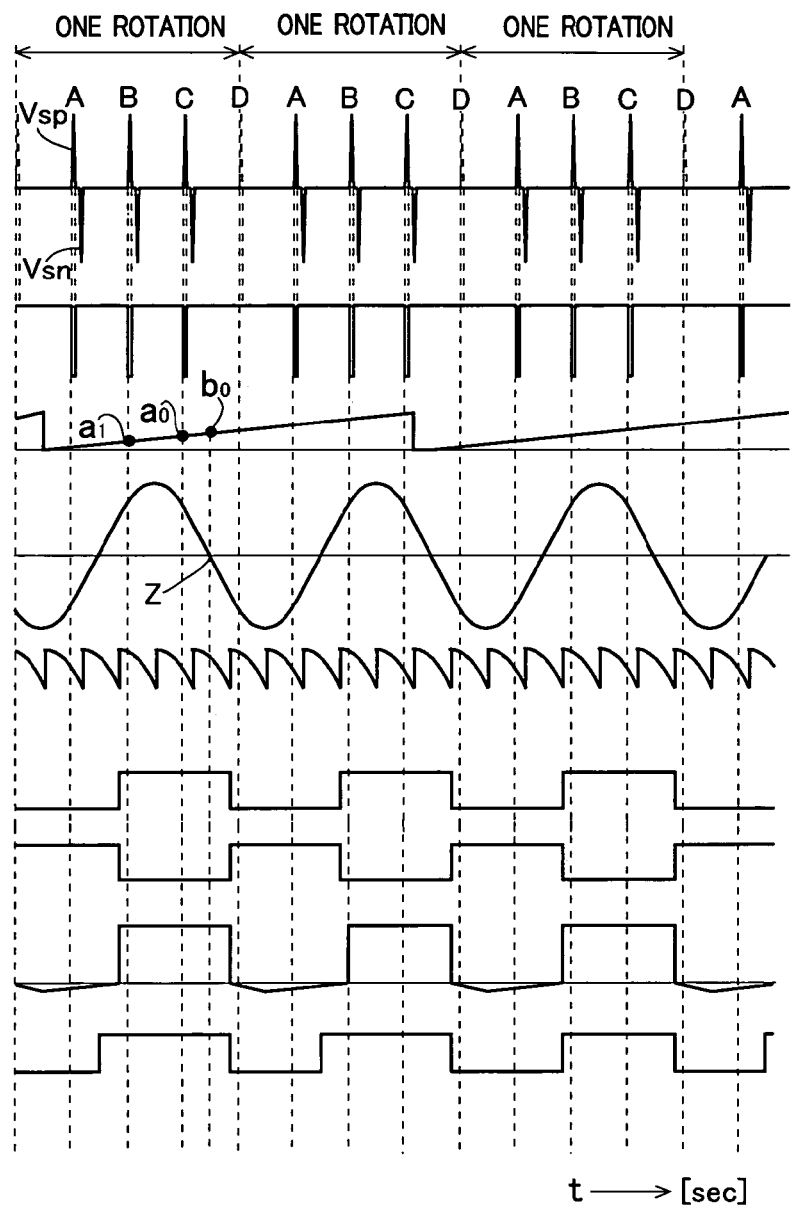

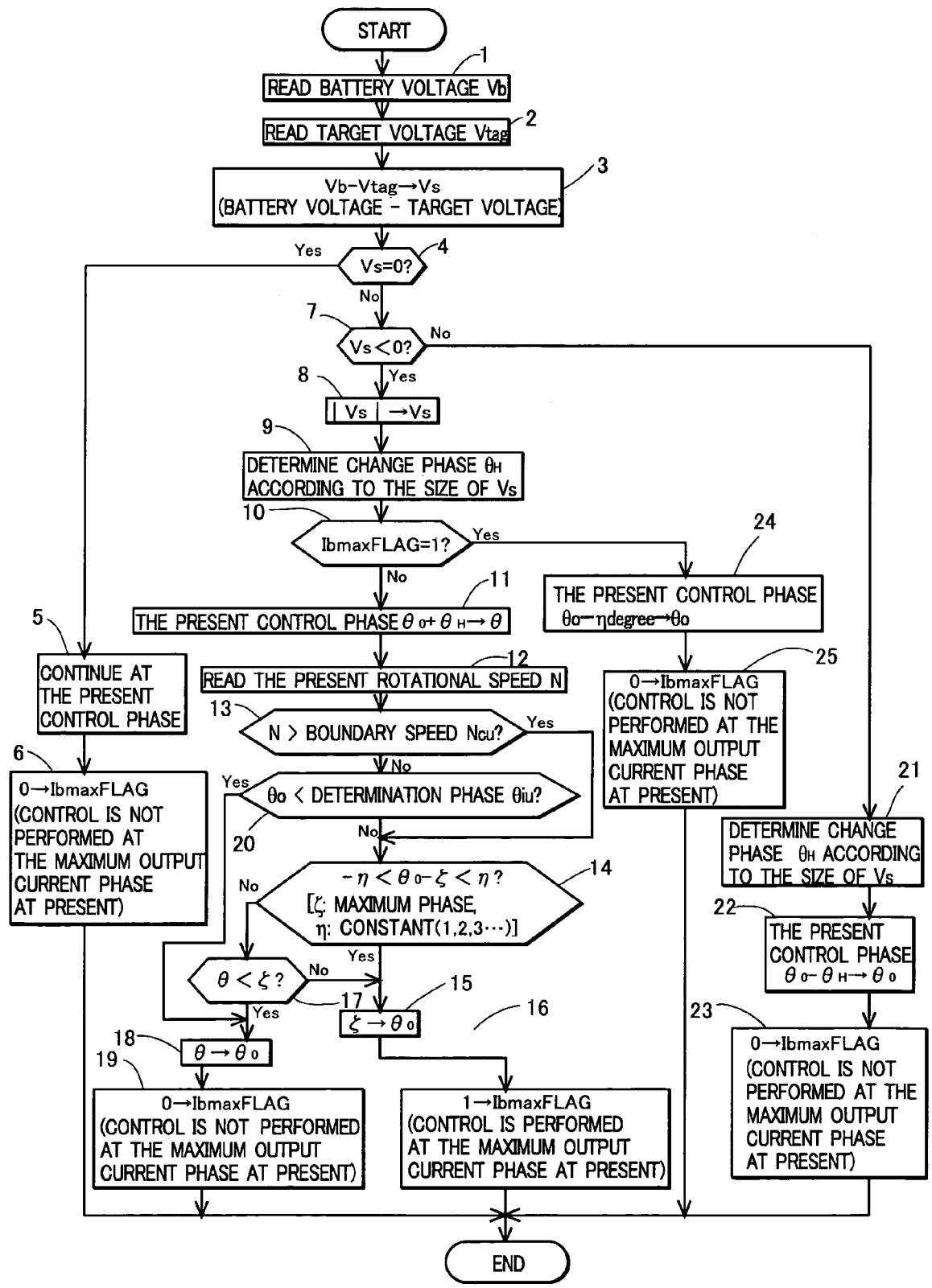

OUTPUT CONTROL DEVICE OF GENERATION DEVICE

TECHNICAL FIELD OF THE INVENTION

The present invention relates to an output control device for controlling an output of a generation device that supplies power to a DC load including voltage accumulation means such as a battery, using an AC generator including a rotor having a magnetic field and a stator having an armature winding comprised of polyphase coils as a power supply.

BACKGROUND OF THE INVENTION

In an engine driven vehicle such as a motorcycle, a generation device is provided that outputs a DC voltage controlled so as not to exceed a set value using a magnetic AC generator driven by an engine as a power supply, and power is supplied from this generation device to a load including a battery.

Unlike an excitation AC generator, the magnetic AC generator cannot control a magnetic field, and thus a short circuit type regulator has been used that short-circuits an output of a generator via an output short-circuit switch when the output of the generator becomes excessive. When using the short circuit type regulator, however, a large current flows through the output short-circuit switch at the time of voltage adjustment to generate a large amount of heat in the output short-circuit switch, and thus a large heatsink needs to be provided to cool the output short-circuit switch, thereby increasing the size of a control device. Also, an output short-circuit switch having a large current capacity needs to be used, thereby increasing costs of the control device.

Thus, as disclosed in Japanese Patent Application Laid-Open Publication No. 11-46456, a control device provided in a generation device that supplies power to a load including voltage accumulation means such as a battery with a rectification output of an AC generator has been proposed in which a circuit for applying an AC control voltage having the same frequency as an output of the generator from the load to an armature winding of the generator is provided, and a phase of the AC control voltage is controlled to adjust an output voltage.

The proposed control device is comprised of a rectifier circuit that has a plurality of input terminals to which an output of the armature winding of the AC generator is input and a pair of output terminals connected across the voltage accumulation means, converts an AC voltage input to the input terminals into a DC voltage, and outputs the DC voltage from the output terminals; an inverter circuit having DC terminals and AC terminals connected to the output terminals and the input terminals of the rectifier circuit; and inverter control means. The inverter control means controls the inverter circuit to convert a voltage across the voltage accumulation means connected across the output terminals of the rectifier circuit into an AC voltage having the same number of phases and the same frequency as the output of the generator, and apply an AC control voltage having a phase adjusted to maintain the output voltage of the rectifier circuit at a target value from the AC terminals to the armature winding.

Providing the circuit that applies the AC control voltage to the armature winding to control the phase of the AC control voltage as described above basically allows the output of the generator to be increased by delaying the phase of the AC control voltage and reduced by advancing the phase of the AC control voltage.

Thus, the phase of the AC control voltage is controlled according to a deviation between the output voltage and the target value so that the phase of the AC control voltage is delayed when the output voltage is lower than the target value, and the phase of the AC control voltage is advanced when the output voltage is higher than the target value, thereby controlling the output voltage to be maintained at the target value. The amount of change in the generator output when the phase of the AC control voltage is changed can be adjusted as required by changing a mean value of the AC control voltage such as by PWM control of switch elements of the inverter circuit.

In the specification, such control is referred to as "vector control" in a sense that a vector (magnitude and phase) of the AC control voltage applied to the armature winding of the generator is controlled to control the generator output.

When the vector control as described above is performed in the magnetic AC generator, delaying the phase of the AC control voltage allows an output current of the generation device to be increased more than in the case without performing the vector control (the case where the generator output is simply provided to the load via the rectifier circuit) in a low rotational speed area of the generator, but delaying the phase of the AC control voltage does not allow the output current to be increased in middle and high rotational speed areas. If the phase of the AC control voltage is excessively delayed, the output current of the generator may be reduced more than in the case without performing the vector control even in any rotational speed area.

In order to prevent an area in which the output current of the generator is reduced from being created by the excessively delayed phase of the AC control voltage, a phase of the AC control voltage in which a maximum output current can be obtained has been previously stored in a memory of a controller as a maximum output current phase (a fixed value) to control the phase of the AC control voltage so as not to be further delayed with respect to the maximum output current phase.

The maximum output current phase, however, actually changes according to conditions such as the temperature of the generator. Thus, if the maximum output current phase is the fixed value, the phase of the AC control voltage may be excessively delayed to prevent proper control when the condition such as the temperature of the generator changes, thereby reducing the output current of the generator more than in the case without performing the vector control.

SUMMARY OF THE INVENTION

An object of the present invention is to provide a control device of a generation device that applies an AC control voltage to an armature coil to control a phase of the AC control voltage and thus control an output of a generator, in which the phase of the AC control voltage is properly controlled to prevent an excessively delayed phase of the AC control voltage in all rotational speed areas of the generator regardless of conditions such as the temperature of the generator, thereby allowing the output of the generator to be taken full advantage of.

The present invention is applied to an output control device for controlling an output of a generation device that supplies power to a DC load including voltage accumulation means using an AC generator including a rotor having a magnetic field and a stator having an armature winding comprised of polyphase coils as a power supply.

The output control device to which the present invention is applied includes: a rectifier circuit that has a plurality of input terminals to which an output of the armature winding is input and a pair of output terminals connected across the voltage accumulation means, converts an AC voltage input to the input terminals into a DC voltage, and outputs the DC voltage from the output terminals; an inverter circuit having DC terminals and AC terminals connected to the output terminals and the input terminals of the rectifier circuit; and a control portion having inverter control means that controls the inverter circuit to convert a voltage across the voltage accumulation means connected across the output terminals of the rectifier circuit into an AC control voltage having the same number of phases and the same frequency as the output of the generator and having a phase adjusted to maintain the output voltage of the rectifier circuit at a target value, and supply the AC control voltage from the AC terminals to the armature winding.

In a generation device that applies an AC control voltage from voltage accumulation means provided on a load side to an armature coil via an inverter circuit for vector control, a maximum output current phase of the AC control voltage is a phase of the AC control voltage that maximizes an output current of the generation device. A maximum value of the output current of the generation device obtained in an area in which a rotational speed exceeds a boundary speed Ncu is an output current value (a rectification output current value) in the case where the output of the generator is simply applied to the voltage accumulation means via the rectifier circuit without performing the vector control. In the area in which the rotational speed exceeds the boundary speed Ncu, delaying the phase of the AC control voltage cannot increase the output current of the generation device to the rectification output current value or more. Thus, in the area in which the rotational speed exceeds the boundary speed Ncu, the output current of the generation device becomes maximum when the phase of the AC control voltage matches a phase of a phase current of the generator, and delaying or advancing the AC control voltage with respect to the phase of the phase current of the generation device causes a reduction in the output current of the generation device. Thus, the phase of the phase current of the generator is preferably a maximum output current phase of the AC control voltage.

Thus, in the present invention, the control portion includes maximum output current phase detection means for detecting a phase of a phase current of the armature winding as a maximum output current phase. The inverter control means includes means for arithmetically operating a target phase of the AC control voltage required for changing the output voltage of the generator in a direction of the output voltage of the rectifier circuit approaching a target voltage, and is comprised so as to control the inverter circuit so that a phase of the AC control voltage applied to the armature winding is equal to the arithmetically operated target phase when the arithmetically operated target phase is advanced with respect to the maximum output current phase detected by the maximum output current phase detection means, while the phase of the AC control voltage applied to the armature winding is equal to the maximum output current phase when the arithmetically operated target phase is equal to or delayed with respect to the detected maximum output current phase, thereby controlling the output voltage of the rectifier circuit to approach the target voltage.

Comprised as described above, regardless of conditions such as the temperature of the generator, the maximum output current phase of the AC control voltage can be properly determined to control the phase of the AC control voltage within a proper range while preventing the phase of the AC control voltage from being excessively delayed in an output current nonincreasing area. This prevents a reduction in the output of the generator in the rotational speed area in which the rotational speed exceeds the boundary speed, thereby allowing the output of the generator to be taken full advantage of.

In a preferable aspect of the present invention, a range of change in the rotational speed of the generator may be divided into an output current increasing area in which the output current of the generation device can be increased more than the output current of the generation device when no AC control voltage is applied to the armature winding by delaying the phase of the AC control voltage, and the output current nonincreasing area in which the output current of the generation device cannot be increased more than the output current of the generation device when no AC control voltage is applied to the armature winding even by delaying the phase of the AC control voltage.

In this case, the inverter control means includes means for arithmetically operating the target phase of the AC control voltage required for changing the output voltage of the generator in the direction of the output voltage of the rectifier circuit approaching the target voltage, and is comprised so as to control the inverter circuit so that a phase of the AC control voltage applied to the armature winding is equal to the arithmetically operated target phase when the rotational speed of the generator is in the output current increasing area and the arithmetically operated target phase is advanced with respect to a determination phase preset within a range in which the phase is not delayed with respect to the maximum output current phase, the phase of the AC control voltage applied to the armature winding is equal to the target phase when the rotational speed of the generator is in the output current increasing area and the arithmetically operated target phase is delayed with respect to the determination phase and advanced with respect to the maximum output current phase, the phase of the AC control voltage applied to the armature winding is equal to the maximum output current phase when the rotational speed of the generator is in the output current increasing area and the arithmetically operated target phase is delayed with respect to the determination phase and equal to or delayed with respect to the maximum output current phase, the phase of the AC control voltage applied to the armature winding is equal to the target phase when the rotational speed of the generator is in the output current nonincreasing area and the arithmetically operated target phase is advanced with respect to the maximum output current phase, and the phase of the AC control voltage applied to the armature winding is equal to the maximum output current phase when the rotational speed of the generator is in the output current nonincreasing area and the arithmetically operated target phase is equal to or delayed with respect to the maximum output current phase, thereby controlling the output voltage of the rectifier circuit to approach the target voltage.

In this case, the determination phase is determined so that the output of the generator is always increased when the rotational speed of the generator is in the output current increasing area and the phase of the AC control voltage applied to the armature winding is delayed within a range not exceeding the determination phase.

Comprised as described above, the phase of the AC control voltage is prevented from exceeding the maximum output current phase in the output current increasing area and the output current nonincreasing area, thereby allowing a sufficient output current to be taken from the generator in all the rotational speed area of the generator.

In a preferable aspect of the present invention, the control device further includes: a signal generator that generates a signal when a rotational angle position of the rotor of the generator matches a predetermined position; a current sensor that detects a phase current of the generator; and a zero cross detection circuit that detects a zero cross point of the phase current from the output of the current sensor, and the maximum output current phase detection means is comprised so as to detect a phase of the phase current from a timing of the signal generator generating the signal and the zero cross point of the phase current detected by the zero cross detection circuit.

As the inverter circuit, a bridge type circuit with arms of a bridge being comprised of MOSFETs may be used. In this case, the control device further includes: a signal generator that generates a signal when a rotational angle position of the rotor of the generator matches a predetermined position; a voltage sensor that detects a voltage between the drain and source of a MOSFET that constitutes one arm of the bridge of the inverter circuit; and a zero cross detection circuit that detects a timing of an output of the voltage sensor changing from a high level to a zero level as a zero cross point of the phase current, and the maximum output current phase detection means is comprised so as to detect the phase of the phase current from the timing of the signal generator generating the signal and the zero cross point of the phase current detected by the zero cross detection circuit.

If the phase current of the generator is detected from the voltage between the drain and source of the MOSFET as described above, the voltage drop between the drain and source of the MOSFET is delayed with respect to the zero cross point of the phase current of the generator when control is performed with the phase of the AC control voltage being delayed with respect to the maximum output current phase. Thus, a phase delayed with respect to an actual phase of the phase current of the generator is detected as the phase of the phase current, and the control is performed with the phase of the AC control voltage being delayed with respect to the maximum output current phase (with the phase being excessively delayed).

Thus, if the phase current is detected from the voltage between the drain and source of the MOSFET that constitutes the inverter circuit as described above, the inverter control means is preferably comprised so as to determine that maximum output current phase control is performed for making the phase of the AC control voltage applied to the armature winding equal to the detected maximum output current phase when a difference between the phase of the present AC control voltage and the maximum output current phase detected by the maximum output current phase detection means is within a predetermined range, and advance the AC control voltage by a predetermined phase when a state where it is determined that the maximum output current phase control is performed lasts for a predetermined time.

As described above, according to the present invention, in the output control device of the generation device in which the AC control voltage is applied from the voltage accumulation means via the inverter circuit to the armature winding of the generator in the generation device that drives the load including the voltage accumulation means with the rectification output of the generator to control the phase of the AC control voltage and thus control the output, the phase of the phase current of the generator is detected to regard the phase of the phase current as the maximum output phase of the AC control voltage. Thus, the maximum output current phase of the AC control voltage can be always properly determined regardless of conditions such as the temperature of the generator to control the phase of the AC control voltage within the proper range while preventing the phase of the AC control voltage from being excessively delayed. This prevents the reduction in the output of the generator caused by the excessive delay of the phase of the AC control voltage in all the rotational speed areas, thereby allowing the output of the generator to be taken full advantage of.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 4 is a graph showing charge current-rotational speed characteristics in the case where a phase of an AC control voltage applied to an armature winding of a magnetic AC generator is changed;

FIGS. 5A to 5E are timing charts for illustrating an operation of the embodiment in FIGS. 1 and 2;

FIG. 7 is a flowchart of an algorithm of a task executed by a microprocessor of a controller in the embodiment in FIGS. 1 and 2;

FIGS. 10A to 10I are timing charts for illustrating an operation of the embodiment in FIGS. 8 and 9;

FIGS. 11A to 11I are timing charts for illustrating another operation of the embodiment in FIGS. 8 and 9;

FIGS. 12A to 12I are timing charts for illustrating a further operation of the embodiment in FIGS. 8 and 9; and FIG. 13 is a flowchart of an algorithm of a task executed by a microprocessor of a controller in the embodiment in FIGS. 8 and 9.

DETAILED DESCRIPTION OF THE PREFERRED EMBODIMENTS

Now, preferred embodiments of the present invention will be described with reference to the drawings.

Figure 1:
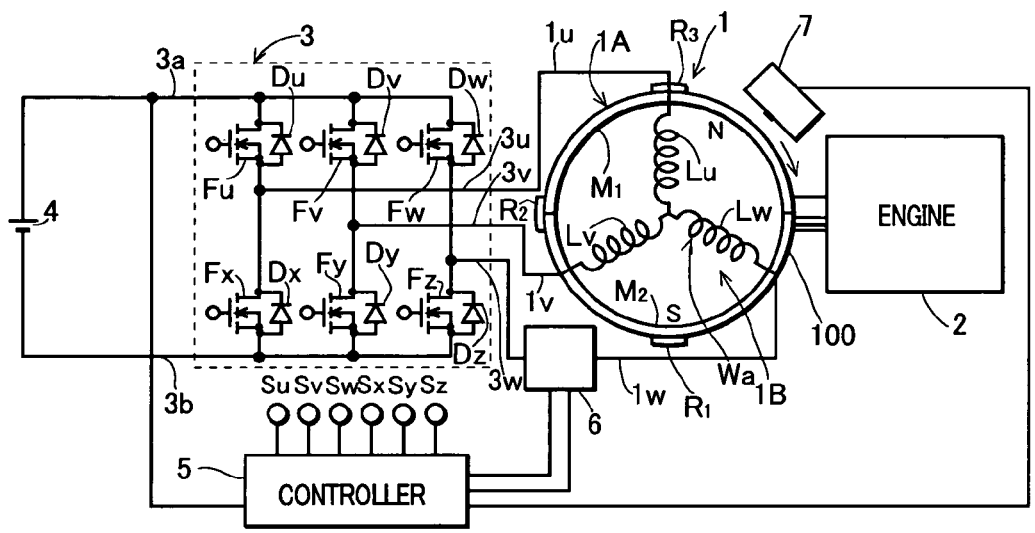
FIG. 1 is a schematic circuit diagram of a construction of hardware according to an embodiment of the present invention.
Figure 2:
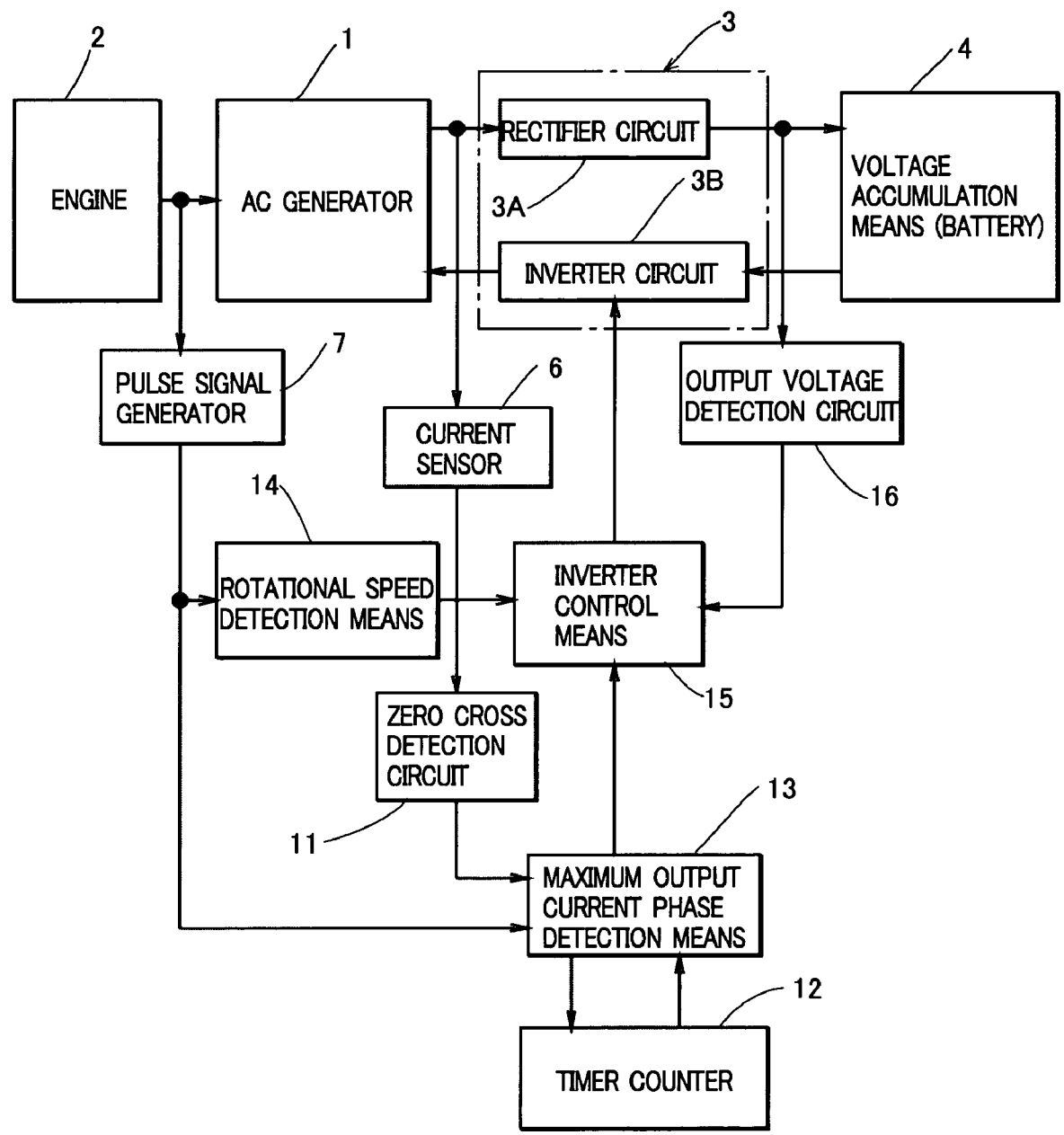
FIG. 2 is a block diagram of a construction of a control device according to the embodiment in FIG. 1.

FIG. 1 shows a construction of a generation device to be controlled in the present invention, and FIG. 2 shows a construction of a control device including means comprised by a microprocessor provided in a controller. In FIG. 1, a reference numeral 1 denotes a magnetic AC generator driven by an engine 2; 3 denotes an AC/DC conversion portion having a rectifier circuit and an inverter circuit; 4 denotes a battery as voltage accumulation means; 5 denotes a controller for controlling the inverter circuit in the AC/DC conversion circuit 3; 6 denotes a current sensor that detects a single phase current flowing through an armature winding of the generator 1; and 7 denotes a pulse signal generator that generates a pulse signal when a rotational angle position of a rotor of the generator 1 matches a predetermined position.

The magnetic AC generator 1 is comprised of a magnet rotor 1A formed by mounting permanent magnets M1 and M2 to an inner periphery of a peripheral wall of an iron rotor yoke 100, and a stator 1B placed inside the magnet rotor 1A, and the magnet rotor 1A is mounted to a crankshaft of the engine 2. The stator 1B is comprised of an unshown armature core having a magnetic pole portion that faces a magnetic pole of the magnet rotor 1A and an armature winding Wa constituted by U-phase to W-phase coils Lu to Lw wound around the armature core and star connected, and three-phase output terminals $1u$ to $1w$ are drawn from terminals opposite to a neutral point of the coils Lu to Lw.

The AC/DC conversion portion 3 is comprised of a diode bridge full-wave rectifier circuit 3A (see FIG. 2) constituted by diodes Du to Dw and Dx to Dz, and an inverter circuit 3B (see FIG. 2) of a bridge type with an upper arm of a bridge being comprised of MOSFETs Fu to Fw having drains connected in common and a lower arm of the bridge being comprised of MOSFETs Fx to Fz having drains connected to sources of the MOSFETs Fu to Fw and sources connected in common.

In the shown inverter circuit 3B, positive and negative DC terminals are drawn from a common connection point of the drains of the MOSFETs Fu to Fw and a common connection point of the sources of the MOSFETs Fx to Fz, and the DC terminals are connected to a positive output terminal $3a$ and a negative output terminal $3b$ of the diode bridge fall wave rectifier circuit constituted by the diodes Du to Dw and Dx to Dz. AC terminals are drawn from connection points between the sources of the MOSFETs Fu to Fw and the drains of the MOSFETs Fx to Fz of the inverter circuit, and are connected to three-phase input terminals $3u$ to $3w$ of the rectifier circuit. The input terminals $3u$ to $3w$ of the rectifier circuit are connected to the three-phase output terminals $1u$ to $1w$ of the armature winding Wa of the generator 1, respectively. As the diodes Du to Dw and Dx to Dz, parasitic diodes formed between the drain and source of the MOSFETs Fu to Fw and Fx to Fz may be used, or independent diodes connected between the drains and sources of the MOSFETs Fu to Fw and Fx to Fz may be used.

The battery 4 is connected between the positive output terminal $3a$ and the negative output terminal $3b$ of the rectifier circuit of the AC/DC conversion portion 3. The U-phase input terminal $3u$ and the V-phase input terminal $3v$ of the rectifier circuit are connected to the U-phase output terminal $1u$ and the V-phase output terminal $1v$ of the AC generator 1, respectively, and the W-phase input terminal $3w$ of the rectifier circuit is connected to the W-phase output terminal $1w$ of the generator via the current sensor 6. The current sensor 6 is comprised of a current transformer or the like, detects a W-phase phase current Iw of the generator 1 flowing through the W-phase coil Lw, and outputs a current detection signal proportional to the W-phase phase current. The output of the current sensor 6 is input to the controller 5. The waveform of the W-phase phase current Iw detected by the current sensor 6 is as shown in FIG. 5D.

Reluctors R1 to R3 comprised of protrusions are formed on the outer periphery of the rotor yoke 100 of the generator 1 in FIG. 1. The pulse signal generator 7 is comprised so as to detect a leading edge and a trailing edge in a rotational direction of each of the reluctors to generate pulse signals with different polarities. In the shown example, the reluctor R1 is placed in a position corresponding to the center of the magnet M2 (the center in a circumferential direction), and the reluctor R2 is placed in a position delayed backward by 90° in a rotational direction (counterclockwise) of the rotor with respect to the reluctor R1. The reluctor R3 is provided in a position delayed backward by 90° in the rotational direction of the rotor with respect to the reluctor R2 (a position 180° apart from the reluctor R1 and corresponding to the center of the magnetic pole of the magnet M1).

The signal Vs generated by the shown pulse signal generator 7 includes a positive pulse signal Vsp generated when the leading edge in the rotational direction of each of the reluctors R1 to R3 is detected and a negative pulse signal Vsn generated when the trailing edge in the rotational direction of each of the reluctors R1 to R3 is detected. In the shown example, the pulse signal generator 7 detects the leading edges in the rotational direction of the reluctors R1 to R3 to generate positive pulse signals Vsp at rotational angle positions of angles A to C. The position of an angle D where no pulse signal is generated is a position delayed by 90° with respect to the position of the angle C. In this example, a zero cross point when the W-phase phase current Iw shifts from a positive half wave to a negative half wave appears between the positions of the angles C and D.

As shown in FIG. 5B, the pulse signal output by the pulse signal generator 7 is converted into an interrupt signal INT that falls from a high level to a low level for each generation of a positive pulse signal Vp and input to a microprocessor provided in the controller 5.

Also, a zero cross detection circuit 11 comprised of a waveform rectifier circuit that converts the waveform of the positive half wave of the phase current Iw into a rectangular waveform is provided in the controller, and a rectangular wave signal Vq (FIG. 5E) output by the zero cross detection circuit is input to the microprocessor. The microprocessor detects the fall of the rectangular wave signal Vq output by the zero cross detection circuit as a zero cross point Z when the phase current Iw shifts from the positive half wave to the negative half wave.

As shown in FIG. 5C, the controller 5 always performs a counting operation for counting a clock pulse, and includes a timer counter 12 that is reset for each count of the clock pulse to a certain value, a maximum output current phase detection means 13 comprised by a microcomputer, rotational speed detection means 14, inverter control means 15, and a voltage detection circuit 16 that detects a voltage across the battery 4 as an output voltage of the generation device.

The maximum output current phase detection means 13 is means for detecting the phase of the phase current Iw from an output pulse of the pulse signal generator 7, a count of the timer counter 12, and an output of the zero cross detection circuit 11. The maximum output current phase detection means 13 reads the count of the timer counter in interrupt processing executed for each input of the interrupt signal INT, and measures a time interval between timings of the inputs of the interrupt signals INT. Then, by using the fact that a time between input of the interrupt signal INT at the position of the angle C and input of the interrupt signal at the position of the angle A is longer than times between other interrupt signals, the maximum output current phase detection means 13 identifies the positions of the angles A to C where the positive pulse signal Vsp is generated, and measures a time between the detection of the position of the angle C and the detection of the zero cross point Z when the phase current Iw shifts from the positive half wave to the negative half wave to specify the phase of the zero cross point Z of the phase current Iw.

The maximum output current phase detection means 13 arithmetically operates a count $\gamma=\alpha/90$ during a rotation of 1° of the rotor from a count $\alpha(=ao-a1)$ of the timer counted during a rotation of the rotor from the position of the angle B to the position of the angle C and an angle (=90°) between the position of the angle B and the position of the angle C, and arithmetically operates a count $\delta=\beta/\gamma$ corresponding to an angle between the position of the angle C and the zero cross point Z from $\gamma$ and a count $\beta$ counted between the detection of the position of the angle C and the detection of the zero cross point Z. Then, $\delta$ is added to the angle C to calculate a count $\epsilon=\delta+C$ that provides a phase of the zero cross point Z of the phase current Iw, thereby specifying the phase of the phase current Iw. Phases of other phase currents are calculated by an arithmetical operation based on the phase of the phase current Iw.

The rotational speed detection means 14 is means for detecting the rotational speed of the generator from the interval between the inputs of the interrupt signals INT, and data of the rotational speed detected by the rotational speed detection means is provided to the inverter control means 15 together with the phase of the phase current Iw detected by the maximum output current phase detection means 13 and data of the output voltage detected by the voltage detection circuit 16.

The microprocessor in the controller 5 stores the positions of the armature winding Wa and the magnet when the pulse signal generator 7 generates each pulse signal Vpn, and can identify the position of the magnet of the magnet rotor relative to the armature winding at the positions of the angles A, B and C. The inverter control means 15 includes means for arithmetically operating a target phase of an AC control voltage (an AC voltage having the same frequency and the same number of phases as the output voltage of the generator 1) required for changing the output voltage of the generator in a direction of the output voltage (the battery voltage in this example) of the generation device detected by the output voltage detection circuit 16 approaching a target voltage, means for determining a proper phase of the AC control voltage applied to the armature winding from the arithmetically operated target phase and other control conditions, and means for providing drive signals Su to Sw and Sx to Sz to gates of the MOSFETs Fu to Fw and Fx to Fz, respectively, that constitute the inverter circuit to control each MOSFET so as to generate the AC control voltage with the proper phase from the inverter circuit 3B, with the time required for 180° rotation of the rotor being regarded as a period of the half wave of the AC control voltage from the output pulse of the pulse signal generator, and controls the phase of the AC control voltage applied to the armature winding from the battery via the inverter circuit to control a deviation between the output voltage (the battery voltage in this example) of the generation device detected by the output voltage detection circuit 16 and the target voltage to approach zero.

The inverter control means 15 basically controls to delay the phase of the AC control voltage with respect to the present phase when the output voltage of the generation device is lower than the target value to approach the output voltage to the target value, and advance the phase of the AC control voltage with respect to the present phase when the output voltage is higher than the target value to approach the output voltage to the target value. If required, the inverter control means 15 controls on/off the MOSFET of the inverter circuit at a predetermined duty ratio to adjust a rate of change in the output when a mean value of the AC control voltage is adjusted to change the phase of the AC control voltage.

However, with the vector control by the AC control voltage only, when the phase of the AC control voltage is delayed, the phase is excessively delayed and the output current of the generator may be reduced more than in the case without performing the vector control by the AC control voltage.

Figure 3:
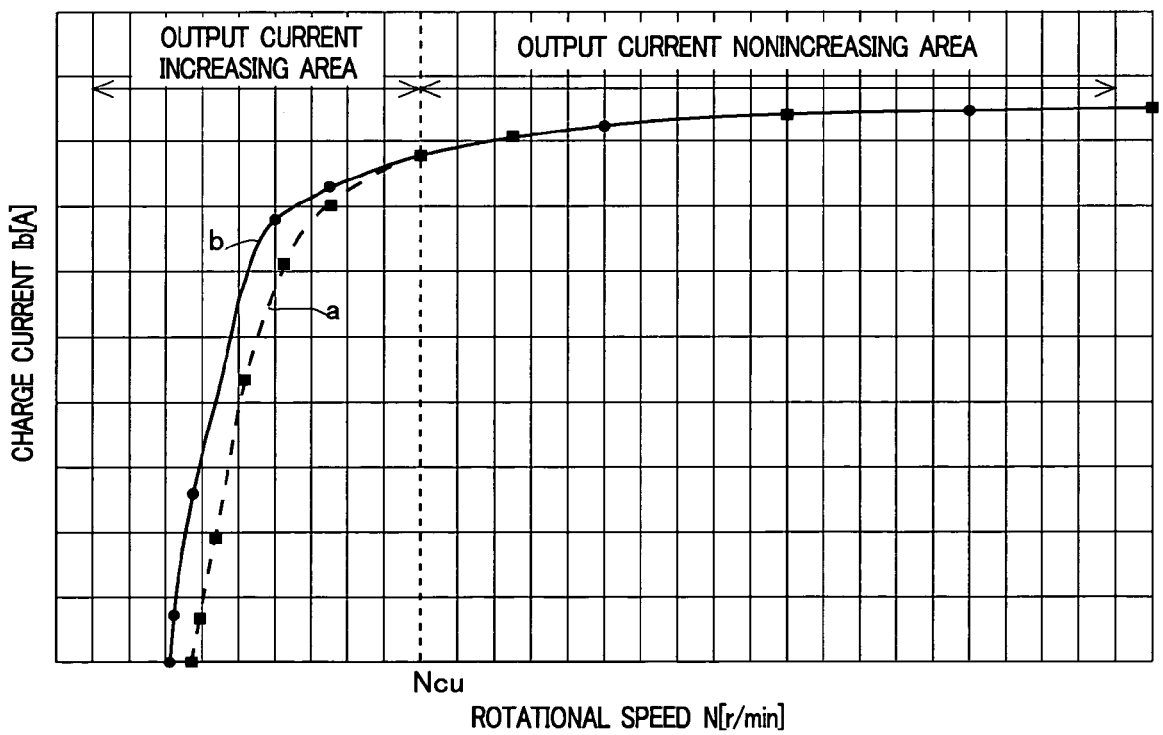
FIG. 3 is a graph showing an example of charge current-rotational speed characteristics in the case where a battery is charged by a generation device according to the present invention.

FIG. 3 shows an example of charge current-rotational speed characteristics that provide a relationship between a charge current of the battery and the rotational speed of the generator when the vector control is performed in the generation device in which the battery is charged with the rectification output of the magnetic AC generator. In FIG. 3, a curve $\underline{a}$ shows a characteristic when the output current of the generator is simply supplied to the battery via the rectifier circuit without the control, and a curve $\underline{b}$ shows a characteristic when the vector control is performed with the phase of the AC control voltage being delayed to a phase in which the output current of the generator is maximized (a maximum output current phase). As shown in FIG. 3, in an area in which the rotational speed of the generator is Ncu or less, the output current (the charge current of the battery in this case) of the generator can be increased, by performing the vector control, more than in the case where the output current of the generator is simply supplied to the battery via the rectifier circuit, while in an area in which the rotational speed exceeds Ncu, the output current of the generator cannot be increased even by performing the vector control. Specifically, in the area in which the rotational speed exceeds Ncu, the output current of the generator cannot be increased, even by performing the vector control, more than in the case where the output of the generator is simply rectified by the rectifier circuit and supplied to the battery. In the specification, Ncu is referred to as a boundary speed. The area in which the rotational speed is equal to or lower than the boundary speed Ncu is referred to as "an output current increasing area", and the area in which the rotational speed exceeds Ncu is referred to as "an output current nonincreasing area".

In such control, if the phase of the AC control voltage is excessively delayed even when the rotational speed of the generator is in any rotational speed area, the output current of the generator may be reduced. FIG. 4 shows charge current (output current)-rotational speed characteristics when the phase of the AC control voltage is delayed by $\alpha1°$, $\alpha2°$, $\alpha3°$, $\alpha4°$, and $\alpha5°$ ($\alpha1°<\alpha2°<\alpha3°<\alpha4°<\alpha5°$) with respect to a phase of a no-load induced voltage of the armature coil. As is apparent from FIG. 4, within a range of the delay angles $\alpha1°$ to $\alpha4°$ of the phase of the AC control voltage, the output current of the generator increases with the increase in the delay angle of the phase of the AC control voltage, but when the delay angle of the phase of the AC control voltage is $\alpha5°$, the output current is reduced more than in the case of the delay angle of $\alpha4°$ in an area in which the rotational speed exceeds Na in FIG. 4.

Thus, in the present invention, a range of change of the phase of the AC control voltage to the delay side is limited to a proper range according to the rotational speed area of the generator to prevent an area in which the output current of the generator is reduced from being created.

When the rotational speed is in the output current nonincreasing area in which the rotational speed exceeds the boundary speed Ncu in FIG. 3, the output current of the generation device cannot be increased more than in the case where the output of the generator is simply supplied to the battery via the rectifier circuit without performing the vector control even by controlling the phase angle of the AC control voltage. Thus, in the output current nonincreasing area, it can be estimated that the charge current supplied to the battery becomes maximum when the phase of the AC control voltage is matched with the phase of the phase current of the generator. Thus, in the output current nonincreasing area, with the phase $\epsilon = C+\delta$ of the phase current of the generator being regarded as the maximum output current phase $\zeta$ of the AC control voltage, the vector control is performed so that the phase of the AC control voltage does not exceed the maximum output current phase.

Specifically, the inverter control means 15 controls the inverter circuit 3B for the vector control so that the phase of the AC control voltage applied to the armature winding Wa is equal to the arithmetically operated target phase when the rotational speed of the generator 1 is in the output current nonincreasing area and the arithmetically operated target phase (the phase required for making the output voltage equal to the target voltage) is advanced with respect to the detected maximum output current phase $\zeta$, and the phase of the AC control voltage applied to the armature winding Wa is equal to the detected maximum output current phase $\zeta$ when the rotational speed of the generator is in the output current nonincreasing area and the arithmetically operated target phase is equal to or delayed with respect to the detected maximum output current phase $\zeta$.

On the other hand, when the rotational speed of the generator is in the output current increasing area in which the rotational speed is equal to or lower than the boundary speed Ncu (an area in which the output of the generator can be increased more than in the case where the output of the generator is simply supplied to the battery via the rectifier circuit by delaying the AC control voltage) in FIG. 3, a determination phase $\theta$iu is used to perform the vector control as described below while preventing the phase of the AC control voltage applied to the armature winding from being limited before the increase in the output of the generator in order to ensure the increase in the output of the generator by controlling the phase of the AC control voltage.

Specifically, the inverter control means 15 controls the inverter circuit 3B for the vector control so that the phase of the AC control voltage applied to the armature winding Wa is equal to the arithmetically operated target phase when the rotational speed of the generator 1 is in the output current increasing area and the arithmetically operated target phase is advanced with respect to the preset determination phase $\theta$iu, the phase of the AC control voltage applied to the armature winding is equal to the arithmetically operated target phase when the rotational speed of the generator 1 is in the output current increasing area and the arithmetically operated target phase is delayed with respect to the determination phase $\theta$iu and advanced with respect to the maximum output current phase, and the phase of the AC control voltage applied to the armature winding is equal to the maximum output current phase $\zeta$ when the rotational speed of the generator is in the output current increasing area and the arithmetically operated target phase is delayed with respect to the determination phase $\theta$iu and equal to or delayed with respect to the maximum output current phase $\zeta$.

The determination phase $\theta$iu is set so as to prevent the phase of the AC control voltage from being limited before the increase in the output of the generator when the phase of the AC control voltage applied to the armature winding is changed to the delay side to increase the output of the generator, and set to a lower value than a limit value on the delay side within the range of change of the phase of the AC control voltage in which the output current of the generator can be reliably increased. Specifically, the determination phase $\theta$iu is determined so that in the case of any change in conditions such as the temperature of the generator, the output of the generator is always increased when the phase of the AC control voltage applied to the armature winding is delayed within a range not exceeding the maximum output current phase (the phase of the phase current of the generator) detected by the maximum output current phase detection means 13 on the advance side with respect to the determination phase $\theta$iu with the rotational speed of the generator being in the output current increasing range. The determination phase is stored in a memory of the microprocessor.

Figure 6:
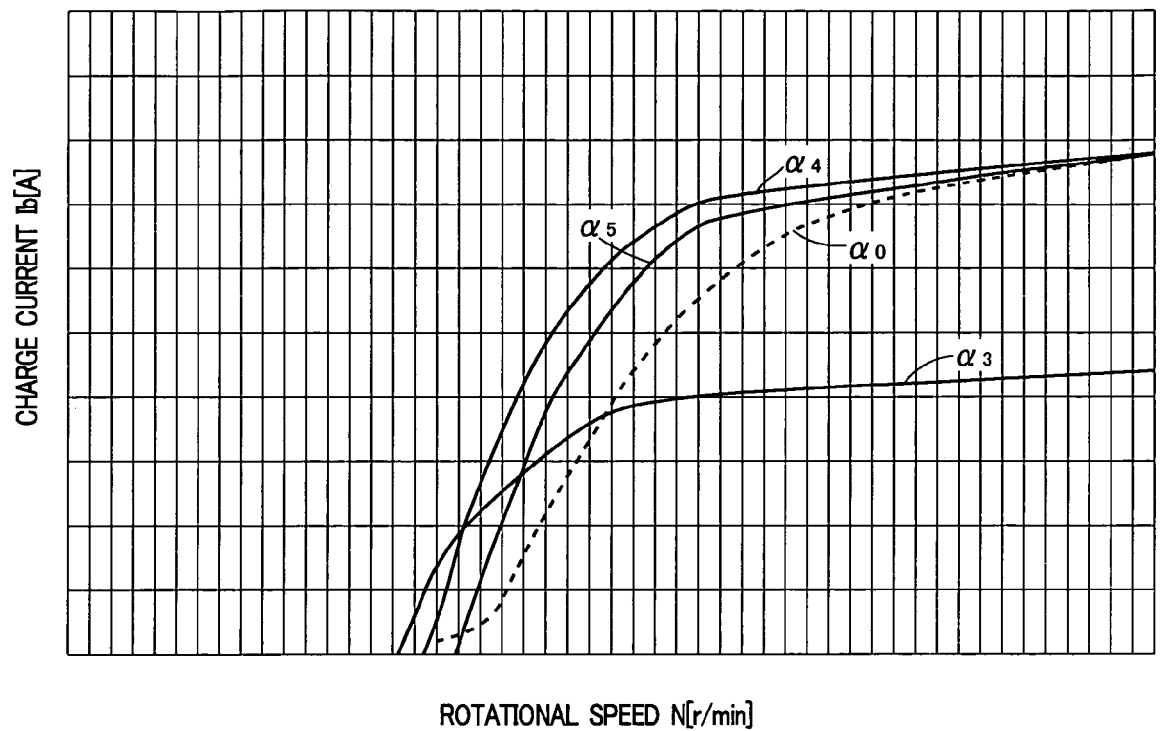
FIG. 6 is a graph showing part of the characteristics in FIG. 3 in an enlarged manner.

For example, when the battery charge current (output current)-rotational speed characteristics show characteristics in FIG. 6 with respect to the phase angles $\alpha 3$ to $\alpha 5$ of the AC control voltage in the output current increasing area, the determination phase $\theta$iu is set to $\{(\alpha 4+\alpha 5)/2\}°$.

FIG. 6 shows characteristics in areas in which the rotational speed is relatively low among the characteristics in FIG. 4 in an enlarged manner, and a characteristic $\alpha$o shown by the broken line in FIG. 6 is a characteristic when the output of the generator is simply rectified and supplied to the battery without performing the vector control.

A flowchart is shown in FIG. 7 of an example of an algorithm of a task executed by the microprocessor for constructing part of the inverter control means when the range of change to the delay side of the phase of the AC control voltage is limited to control the output of the generator as described above. The task in FIG. 7 is executed for each lapse of time corresponding to one cycle of the output of the generator 1 (for every one rotation of the rotor of the generator in the embodiment). According to the algorithm in FIG. 7, first in Step 1, an output voltage (a voltage across the battery 4) Vb of the generation device is read, and in Step 2, a target voltage Vtag is read. Then, in Step 3, the target voltage Vtag is subtracted from the battery voltage Vb to arithmetically operate a deviation Vs, and it is determined in Step 4 whether the deviation Vs is 0. When it is determined that the deviation Vs is 0 (it is determined that the output voltage is equal to the target voltage), the process proceeds to Step 5, and the phase of the AC control voltage is maintained at the present phase to finish the task.

When it is determined in Step 4 that the deviation Vs is not zero, the process proceeds to Step 6, and it is determined whether the deviation Vs is negative (whether the output voltage is lower than the target voltage Vtag). When it is determined that the deviation Vs is negative (the output voltage is lower than the target voltage), the process moves to Step 7 to take the absolute value of the deviation Vs, and in Step 7, a change angle $\theta$H is determined that is added to the present phase for changing the phase of the AC control voltage to the delay side with respect to the absolute value of the deviation Vs. The change angle OH may be a predetermined fixed value, or may be determined by an arithmetical operation with respect to the absolute value of the deviation Vs.

Then in Step 9, the change angle $\theta$H is added to the present phase $\theta$o of the AC control voltage to arithmetically operate a new phase (a target phase) $\theta$ after the delay of the AC control voltage, and in Step 10, the present rotational speed N detected by the rotational speed detection means is read. Then in Step 11, it is determined whether the rotational speed N exceeds the boundary speed Ncu. When it is determined that the rotational speed N exceeds the boundary speed Ncu, the process proceeds to Step 12, and it is determined whether the arithmetically operated new phase $\theta$ exceeds a maximum output current phase C. When it is determined that the new phase $\theta$ exceeds the maximum output current phase ζ, the process proceeds to Step 13, and the maximum output current phase ζ is regarded as the phase θo to be controlled of the AC control voltage to finish the task. When it is determined in Step 12 that the new phase θ does not exceed the maximum output current phase ζ, the process proceeds to Step 14, and the arithmetically operated new phase θ is regarded as the phase θo to be controlled to finish the task.

In Step 11, when it is determined that the rotational speed N is equal to or lower than the boundary speed Ncu, the process proceeds to Step 15, and it is determined whether the phase θo to be controlled of the AC control voltage is lower than the determination phase θiu (advanced). When it is determined in Step 15 that the phase θo to be controlled is lower than the determination phase θiu, the process proceeds to Step 14, and the new phase θ is regarded as the phase θo to be controlled to finish the task. When it is determined in Step 15 that the phase θo to be controlled is higher than the determination phase θiu, the process moves to Step 12, and it is determined whether the arithmetically operated new phase θ exceeds the maximum output current phase ζ. When it is determined that the new phase θ exceeds the maximum output current phase ζ, the process proceeds to Step 13, and the maximum output current phase ζ is regarded as the phase θo to be controlled of the AC control voltage to finish the task. When it is determined in Step 12 that the new phase θ does not exceed the maximum output current phase ζ, the process proceeds to Step 14, and the arithmetically operated new phase θ is regarded as the phase θo to be controlled to finish the task.

In the embodiment, the current sensor 6 that detects the phase current of the armature winding and the zero cross detection circuit 11 that detects the zero cross point of the phase current detected by the current sensor are provided, and the maximum output current phase detection means 13 is comprised so as to detect the zero cross point detected by the zero cross detection circuit 11 as the phase of the phase current, but the maximum output current phase may be calculated by detecting the phase of the phase current of the armature winding from the voltage between the drain and source of the MOSFET that constitutes the inverter circuit.

Specifically, the pulse signal generator 7 that generates a pulse when the rotational angle position of the rotor of the generator matches the predetermined position, a voltage sensor that detects the voltage between the drain and source of the MOSFET that constitutes one arm of the bridge of the inverter circuit, and the zero cross detection circuit that detects the fall of the output of the voltage sensor as the zero cross point of the phase current are provided, and the maximum output current phase control means may be comprised so as to detect the phase of the phase current from the phase in which the pulse signal generator generates a pulse and the voltage drop between the drain and source of the MOSFET detected by the zero cross detection circuit.

Figure 8:
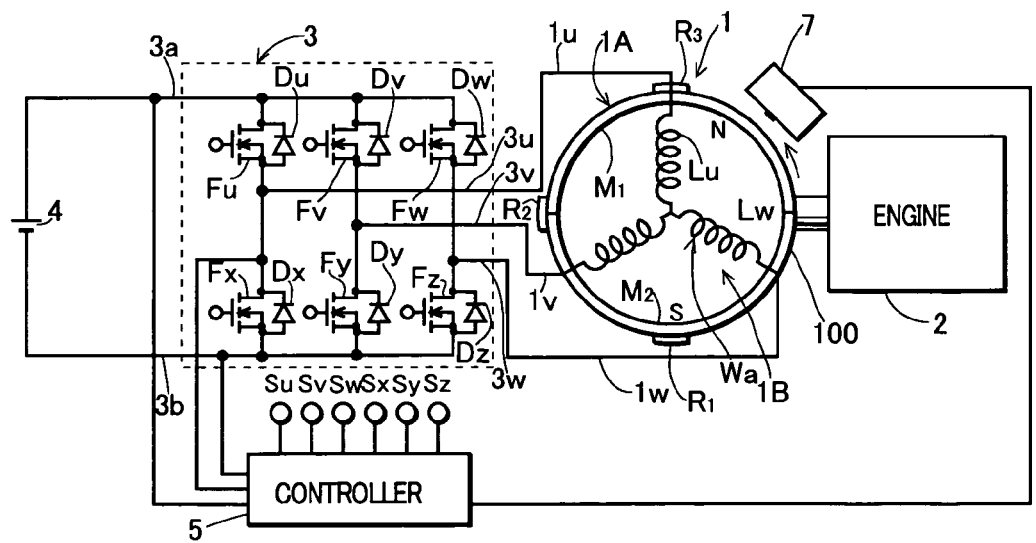
FIG. 8 is a schematic circuit diagram of a construction of hardware according to another embodiment of the present invention.

A construction of hardware in this case is, for example, as shown in FIG. 8. In the example in FIG. 8, the voltage between the drain and source of the MOSFET Fx connected in series to the U-phase MOSFET is input to the controller 5.

Figure 9:
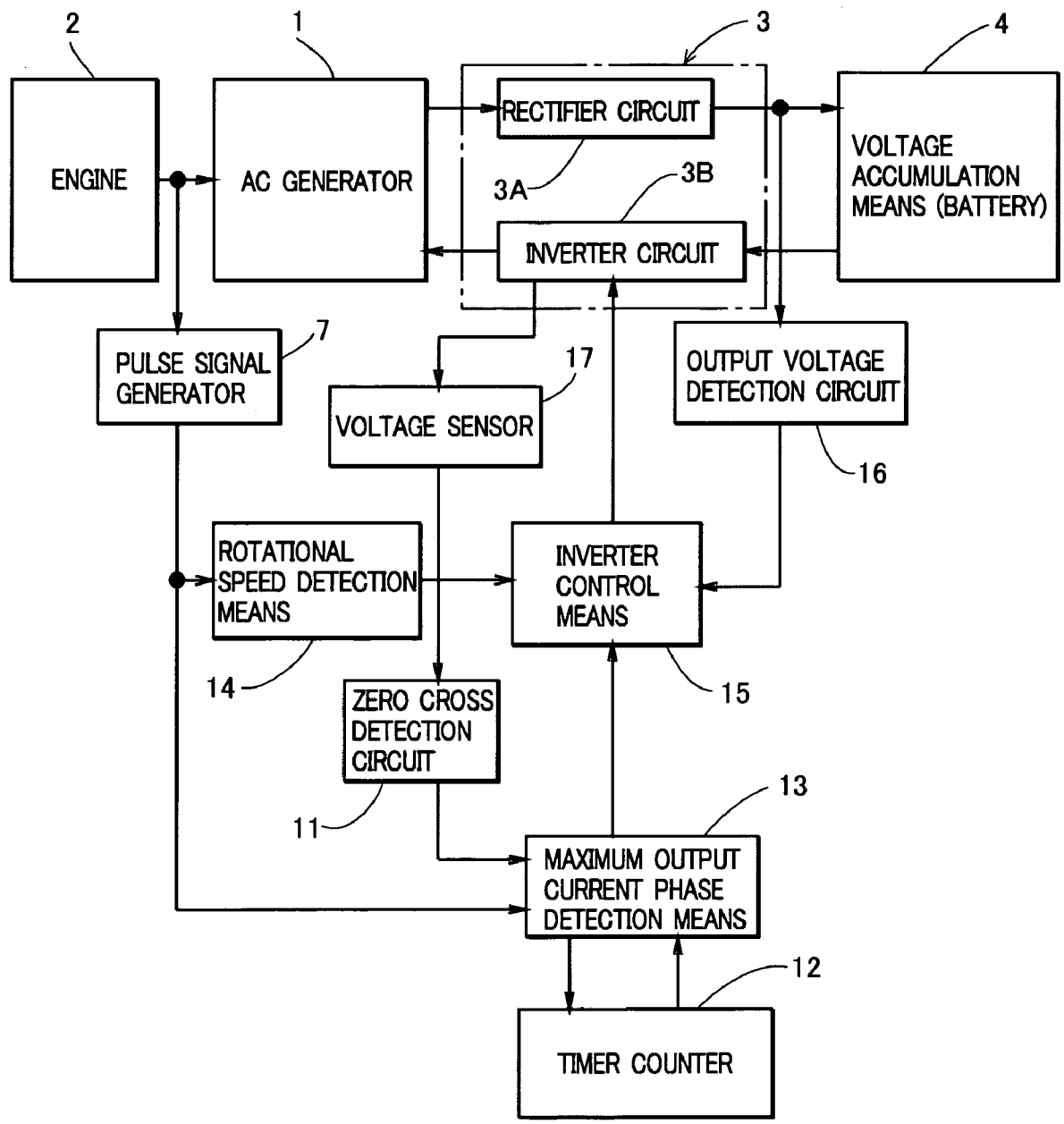
FIG. 9 is a block diagram of a construction of a control device according to the embodiment in FIG. 8.

As shown in FIG. 9, a voltage sensor 17 that detects the voltage between the drain and source of the MOSFET Fx is provided in the controller 5, and the output of the voltage sensor 17 is input to the zero cross detection circuit 11. The zero cross detection circuit 11 detects a timing when the output of the voltage sensor 17 changes from a high level to a zero level as the zero cross point of the U-phase phase current Iu. Hardware or other constructions are the same as in the example in FIG. 1.

FIGS. 10A to 10I are timing charts showing operations of the embodiment. In this example, a set value of the charge current supplied to the battery is lower than a maximum value of the charge current output by the generation device. FIG. 10A shows a waveform of the pulse signal Vs output by the pulse signal generator 7, and FIG. 10B shows an interrupt signal obtained by rectifying the waveform of the pulse signal Vs. FIG. 10C shows an operation of the timer counter, and FIG. 10D shows a waveform of the U-phase phase current Iu of the generator 1. Further, FIG. 10E shows a waveform of the charge current flowing into the battery, and FIGS. 10F and 10G show the gate signals Su and Sx provided to the gates of the MOSFETs Fu and Fx, respectively. FIG. 10H shows a voltage Vdsx between the drain and source of the MOSFET Fx, and FIG. 10I shows a detection signal Vq' obtained by the zero cross detection circuit 11.

When the set value of the charge current supplied to the battery is lower than the maximum value of the charge current output by the generation device, the MOSFET of the inverter circuit is controlled so that an AC control voltage advanced with respect to the phase of the phase current is applied to the armature winding of the generator from the inverter circuit every time the charge current of the battery reaches the set value to reduce the three-phase output current of the generation device. Thus, the waveform of the charge current Ic is a waveform that falls every time the phase current of each phase reaches the set value as shown in FIG. 10E. When such control is performed, the gate signal Su of the U-phase MOSFET Fu is set to zero at a timing advanced with respect to the zero cross point of the U-phase phase current Iu, and the gate signal Sx is provided to the MOSFET Fx, but the voltage Vsdx does not become zero immediately after the gate signal Sx is provided to the MOSFET Fx, but becomes zero when the phase current Iu becomes zero. Thus, the output signal Vq' of the zero cross detection circuit 11 reaches the zero level when the U-phase phase current Iu becomes zero. In this case, the phase of the U-phase phase current can be detected as in the embodiment in FIG. 1, and the phases of the V-phase and W-phase phase currents can be arithmetically operated from the phase of the U-phase phase current.

FIGS. 11A to 11I are timing charts when the control is performed with the phase of the AC control voltage being equal to the maximum output current phase (when the maximum output current phase control is performed). In this case, the phase of the AC control voltage of each phase matches the phase of the current of each phase of the generator, and thus the zero point of the voltage between the drain and source of the MOFET Fx can be detected by the zero cross detection circuit 11 to detect the zero cross point of the U-phase phase current, and the maximum output current phase of the AC control voltage can be detected as in the embodiment in FIG. 1.

FIGS. 12A to 12I are timing charts of operations when the control is performed with the phase of the AC control voltage being delayed with respect to the maximum output current phase. In this case, the timing when the voltage between the drain and source of the MOFET Fx falls to zero is delayed with respect to the timing when the phase current Iu passes through the zero cross point, and thus the zero cross point of the U-phase current cannot be detected even by detecting the timing when the voltage between the drain and source of the MOSFET falls to zero. If this state lasts, the phase of the maximum output current phase cannot be properly detected, and the control is performed with the phase of the AC control voltage being excessively delayed. In order to prevent such a situation, in the embodiment, the inverter control means 15 is comprised so as to determine that the maximum output current phase control (the control to make the phase of the AC control voltage equal to the maximum output current phase) is performed when the difference between the phase of the AC control voltage to be controlled (the arithmetically operated target phase) and the maximum output current phase detected by the maximum output current phase detection means is within a predetermined range, and advance the AC control voltage by a predetermined phase when a state where it is determined that the maximum output current phase control is performed lasts for a predetermined time.

In the embodiment, a flowchart is shown in FIG. 13 of an algorithm of a task executed by the microprocessor for each lapse of time of one cycle of the output of the generator. According to the algorithm, first in Step 1, an output voltage (a voltage across the battery 4) Vb of the generation device is read, and in Step 2, a target voltage Vtag is read. Then, in Step 3, the target voltage Vtag is subtracted from the battery voltage Vb to arithmetically operate a deviation Vs, and it is determined in Step 4 whether the deviation Vs is 0. When it is determined that the deviation Vs is 0 (it is determined that the output voltage is equal to the target voltage), the process proceeds to Step 5, and the phase of the AC control voltage is maintained at the present phase to continue the present control. Then in Step 6, IbmaxFLAG is set to 0 to store the control in the maximum output current phase being not performed at present, and finish the task.

When it is determined in Step 4 that the deviation Vs is not zero, the process proceeds to Step 7, and it is determined whether the deviation Vs is negative (whether the output voltage is lower than the target voltage Vtag). When it is determined that the deviation Vs is negative (the output voltage is lower than the target voltage), the process moves to Step 8 to take the absolute value of the deviation Vs, and in Step 9, a change angle θH is determined that is added to the present phase for changing the phase of the AC control voltage to the delay side with respect to the absolute value of the deviation Vs.

Then in Step 10, it is determined whether the IbmaxFLAG is 1. When it is determined that the IbmaxfFLAG is not 1 (the maximum output current phase control is not performed), in Step 11, the change angle θH is added to the phase θo to be controlled of the AC control voltage to arithmetically operate a new phase (a target phase) θ after the delay of the AC control voltage, and then in Step 12, the present rotational speed N detected by the rotational speed detection means is read. Then in Step 13, it is determined whether the rotational speed N exceeds the boundary speed Ncu. When it is determined that the rotational speed N exceeds the boundary speed Ncu, the process proceeds to Step 14, and it is determined whether the difference θo−ζ between the phase θo to be controlled and the maximum output current phase ζ is between −η and +η. Specifically, it is determined whether the difference between the phase θo to be controlled of the AC control voltage and the maximum output current phase ζ detected by the maximum output current phase detection means is within a predetermined range. Here, η is a positive integer equal to or larger than 1.

When it is determined in Step 14 that θo−ζ is between −η and +η (the difference between the phase θo to be controlled of the AC control voltage and the maximum output current phase ζ detected by the maximum output current phase detection means is within the predetermined range), the process proceeds to Step 15, and the maximum output current phase ζ is regarded as the phase θo to be controlled of the AC control voltage. Then in Step 16, the IbmaxFLAG is set to 1 to store the maximum output current phase control being performed at present, and finish the task. When it is determined in Step 14 that θo−ζ is not between −η and +η (the difference between the phase θo to be controlled of the AC control voltage and the maximum output current phase ζ detected by the maximum output current phase detection means is not within the predetermined range), the process proceeds to Step 17, and it is determined whether the arithmetically operated new phase (the target phase) is lower than the maximum output current phase ζ. When it is determined that the new phase is lower than the maximum output current phase ζ, the process proceeds to Step 18, and the new phase θ is regarded as the phase θo to be controlled. Then in Step 19, the IbmaxFLAG is set to 0 to store the maximum output current phase control being not performed at present, and finish the task.

When it is determined in Step 17 that the new phase θ is not lower than the maximum output current phase ζ, the process proceeds to Step 15, and the maximum output current phase ζ is regarded as the phase θo to be controlled of the AC control voltage. Then in Step 16, the IbmaxFLAG is set to 1 to store the maximum output current phase control being performed at present, and finish the task.

When it is determined in Step 13 that the rotational speed N does not exceed the boundary speed Ncu, the process proceeds to Step 20, and it is determined whether the phase θo to be controlled is lower than the determination phase θiu. When it is determined that the phase θo to be controlled is lower than the determination phase θiu, the process moves to Step 18. When it is determined that the phase θo to be controlled is not lower than the determination phase θiu, the process moves to Step 14.

When it is determined in Step 7 that the deviation Vs is not negative (the battery voltage exceeds the target voltage), the process proceeds to Step 21 to determine the change angle θH for changing the AC control voltage to the advance side with respect to the deviation Vs, and in Step 22, a value obtained by subtracting the change angle θH from θo is regarded as the phase θo to be controlled. Then in Step 23, the IbmaxFLAG is set to 0, and the task is finished.

When it is determined in Step 10 that the IbmaxFLAG is 1 (the maximum output current phase control is performed at present), the process proceeds to Step 24, and a value obtained by subtracting a default η from the present phase θo is regarded as the phase θo to be controlled to advance the phase of the AC control voltage. In Step 25, the Ibmax-FLAG is set to 0, and then the task is finished. The value of η is set to a value so that the phase θo of the AC control voltage can be advanced with respect to the maximum output current phase ζ.

Comprised as shown in FIG. 13, when it is determined that the maximum output current phase control is performed for a predetermined time (a period of one cycle of the output of the generator in the embodiment), the phase of the AC control voltage is advanced in Step 24, and the voltage between the drain and source of the MOSFET Fx can be returned to zero at the timing when the U-phase phase current Iu reaches the zero cross point, thereby preventing the control from being continued with the phase of the AC control voltage being delayed with respect to the maximum output current phase. This also prevents the phase of the AC control voltage from being delayed with respect to the maximum output current phase.

As described above, the zero cross point of the phase current is detected from the voltage between the drain and source of the MOSFET that constitutes one arm of the bridge of the inverter circuit, which requires no current sensor, thereby reducing costs.

In the embodiment, the magnetic field of the rotor of the magneto generator has the two poles, but the present invention may be of course applied to the case where the magnetic field of the rotor has 2n poles (n is an integer equal to or larger than 1).

In the embodiment, the AC generator 1 is the magnetic AC generator, but the present invention may be applied to the case where an excitation AC generator having a magnetic field winding on a rotor side is used.

When the magnetic AC generator is used, an interpole made of ferromagnetic material such as iron is provided between the magnetic poles of the rotor comprised of permanent magnets, thereby allowing the control of the output of the generator to be effectively performed by the AC control voltage.

In the above example, the pulse signal generator that detects the edge of the reluctor to generate the pulse signal is used as the means for detecting the rotational angle position of the rotor of the generator. The signal generator, however, may generate a signal including information on the rotational angle position of the rotor, and thus other signal generators, for example, a hall IC that detects the polarity of the magnetic pole of the rotor to output a rectangular wave signal including information on the rotational angle position of the rotor may be used.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. An output control device of a generation device for controlling an output of the generation device that supplies power to a DC load including voltage accumulation means using an AC generator including a rotor having a magnetic field and a stator having an armature winding comprised of polyphase coils as a power supply, comprising:

a rectifier circuit that has a plurality of input terminals to which an output of said armature winding is input and a pair of output terminals connected across said voltage accumulation means, converts an AC voltage input to said input terminals into a DC voltage, and outputs the DC voltage from said output terminals;

an inverter circuit having DC terminals and AC terminals connected to the output terminals and the input terminals of said rectifier circuit; and a control portion having inverter control means that controls said inverter circuit to convert a voltage across the voltage accumulation means connected across the output terminals of said rectifier circuit into an AC control voltage having the same number of phases and the same frequency as the output of said generator, and supply said AC control voltage from said AC terminals to said armature winding, wherein said control portion includes maximum output current phase detection means for detecting a phase of a phase current of said armature winding as a maximum output current phase, and said inverter control means includes means for arithmetically operating a target phase of said AC control voltage required for changing an output voltage of said generator in a direction of the output voltage of said rectifier circuit approaching a target voltage, and is comprised so as to control said inverter circuit so that a phase of the AC control voltage applied to said armature winding is equal to the arithmetically operated target phase when the arithmetically operated target phase is advanced with respect to said maximum output current phase, while the phase of the AC control voltage applied to said armature winding is equal to said maximum output current phase when the arithmetically operated target phase is equal to or delayed with respect to said maximum output current phase, thereby controlling the output voltage of said rectifier circuit to approach said target voltage.

2. An output control device of a generation device for controlling an output of the generation device that supplies power to a DC load including voltage accumulation means using an AC generator including a rotor having a magnetic field and a stator having an armature winding comprised of polyphase coils as a power supply, comprising:

a rectifier circuit that has a plurality of input terminals to which an output of said armature winding is input and a pair of output terminals connected across said voltage accumulation means, converts an AC voltage input to said input terminals into a DC voltage, and outputs the DC voltage from said output terminals;

an inverter circuit having DC terminals and AC terminals connected to the output terminals and the input terminals of said rectifier circuit; and a control portion having inverter control means that controls said inverter circuit to convert a voltage across the voltage accumulation means connected across the output terminals of said rectifier circuit into an AC control voltage having the same number of phases and the same frequency as the output of said generator, and supply said AC control voltage from said AC terminals to said armature winding, wherein said control portion includes maximum output current phase detection means for detecting a phase of a phase current of said armature winding as a maximum output current phase, a range of change in a rotational speed of said generator is divided into an output current increasing area in which an output current of said generation device can be increased more than an output current of said generation device when no AC control voltage is applied to said armature winding by delaying a phase of said AC control voltage, and an output current nonincreasing area in which the output current of said generation device cannot be increased more than the output current of said generation device when no AC control voltage is applied to said armature winding even by delaying the phase of said AC control voltage, said inverter control means includes means for arithmetically operating a target phase of said AC control voltage required for changing an output voltage of said generator in a direction of the output voltage of said rectifier circuit approaching a target voltage, and is comprised so as to control said inverter circuit so that a phase of the AC control voltage applied to said armature winding is equal to the arithmetically operated target phase when the rotational speed of said generator is in said output current increasing area and the arithmetically operated target phase is advanced with respect to a determination phase preset within a range in which the phase is not delayed with respect to said maximum output current phase, the phase of the AC control voltage applied to said armature winding is equal to the arithmetically operated target phase when the rotational speed of said generator is in said output current increasing area and the arithmetically operated target phase is delayed with respect to said determination phase and advanced with respect to said maximum output current phase, the phase of the AC control voltage applied to said armature winding is equal to said maximum output current phase when the rotational speed of said generator is in said output current increasing area and the arithmetically operated target phase is delayed with respect to said determination phase and equal to or delayed with respect to said maximum output current phase, the phase of the AC control voltage applied to said armature winding is equal to the arithmetically operated target phase when the rotational speed of the generator is in the output current nonincreasing area and the arithmetically operated target phase is advanced with respect to said maximum output current phase, and the phase of the AC control voltage applied to said armature winding is equal to said maximum output current phase when the rotational speed of said generator is in said output current nonincreasing area and the arithmetically operated target phase is equal to or delayed with respect to said maximum output current phase, thereby controlling the output voltage of said rectifier circuit to approach said target voltage, and said determination phase is determined so that the output of said generator is always increased when the rotational speed of said generator is in said output current increasing area and the phase of the AC control voltage applied to said armature winding is delayed within a range not exceeding said determination phase.

3. The output control device of a generation device according to claim 1, further comprising: a signal generator that generates a signal including information on a rotational angle position of said rotor when the rotational angle position of the rotor of said generator matches a predetermined position; a current sensor that detects a phase current of said generator; and a zero cross detection circuit that detects a zero cross point of said phase current from the output of said current sensor, wherein said maximum output current phase detection means is comprised so as to detect a phase of said phase current from a timing of said signal generator generating the signal and the zero cross point of the phase current detected by said zero cross detection circuit.

4. The output control device of a generation device according to claim 2, further comprising: a signal generator that generates a signal including information on a rotational angle position of said rotor when the rotational angle position of the rotor of said generator matches a predetermined position; a current sensor that detects a phase current of said generator; and a zero cross detection circuit that detects a zero cross point of said phase current from the output of said current sensor, wherein said maximum output current phase detection means is comprised so as to detect a phase of said phase current from a timing of said signal generator generating the signal and the zero cross point of the phase current detected by said zero cross detection circuit.

5. The output control device of a generation device according to claim 1, wherein said inverter circuit is comprised of a bridge type circuit with arms of a bridge being comprised of MOSFETs, said control device further comprises: a pulse signal generator that generates a pulse when a rotational angle position of the rotor of said generator matches a predetermined position; a voltage sensor that detects a voltage between the drain and source of a MOSFET that constitutes one arm of the bridge of said inverter circuit; and a zero cross detection circuit that detects a timing of an output of said voltage sensor changing from a high level to a zero level as a zero cross point of said phase current, and said maximum output current phase detection means is comprised so as to detect a phase of said phase current from the timing of said signal generator generating the signal and the zero cross point of the phase current detected by said zero cross detection circuit, and said inverter control means is comprised so as to determine that maximum output current phase control is performed for making the phase of the AC control voltage applied to said armature winding equal to the detected maximum output current phase when a difference between the phase of the present AC control voltage and the maximum output current phase detected by said maximum output current phase detection means is within a predetermined range, and advance said AC control voltage by a predetermined phase when a state where it is determined that the maximum output current phase control is performed lasts for a predetermined time.

6. The output control device of a generation device according to claim 2, wherein said inverter circuit is comprised of a bridge type circuit with arms of a bridge being comprised of MOSFETs, said control device further comprises: a pulse signal generator that generates a pulse when a rotational angle position of the rotor of said generator matches a predetermined position; a voltage sensor that detects a voltage between the drain and source of a MOSFET that constitutes one arm of the bridge of said inverter circuit; and a zero cross detection circuit that detects a timing of an output of said voltage sensor changing from a high level to a zero level as a zero cross point of said phase current, said maximum output current phase detection means is comprised so as to detect a phase of said phase current from the timing of said signal generator generating the signal and the zero cross point of the phase current detected by said zero cross detection circuit, and said inverter control means is comprised so as to determine that maximum output current phase control is performed for making the phase of the AC control voltage applied to said armature winding equal to the detected maximum output current phase when a difference between the phase of the present AC control voltage and the maximum output current phase detected by said maximum output current phase detection means is within a predetermined range, and advance said AC control voltage by a predetermined phase when a state where it is determined that the maximum output current phase control is performed lasts for a predetermined time.

* * * * *

UNITED STATES PATENT AND TRADEMARK OFFICE
CERTIFICATE OF CORRECTION

| | |
|---|---|
| PATENT NO. | : 7,253,590 B2 |
| APPLICATION NO. | : 11/263809 |
| DATED | : August 7, 2007 |
| INVENTOR(S) | : Hideaki Suzuki et al. |

It is certified that error appears in the above-identified patent and that said Letters Patent is hereby corrected as shown below:

Column 12, line 66:   Please delete "C", and insert therefor --$\zeta$--.

Signed and Sealed this

Thirteenth Day of May, 2008

JON W. DUDAS
*Director of the United States Patent and Trademark Office*